July 3, 1951                R. RING                  2,559,373

WELL SURVEYING INSTRUMENT

Filed Nov. 16, 1945                                 3 Sheets-Sheet 2

WITNESS:
Rob R Kitchel.

INVENTOR.
Roland Ring
BY
ATTORNEYS.

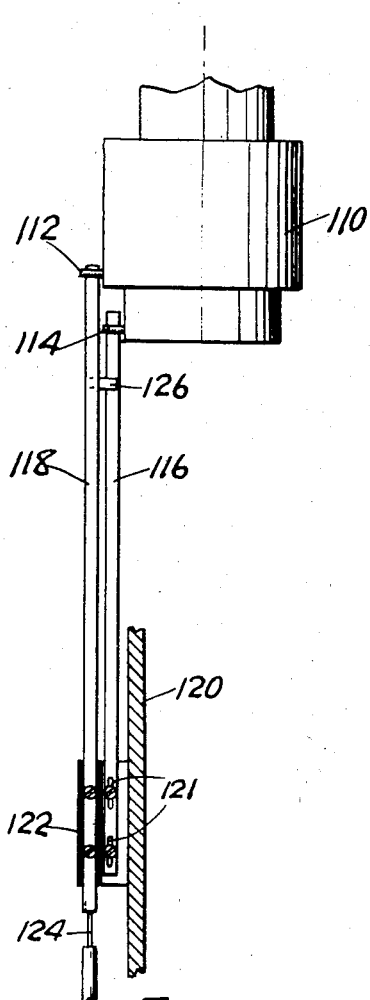
FIG. 5.
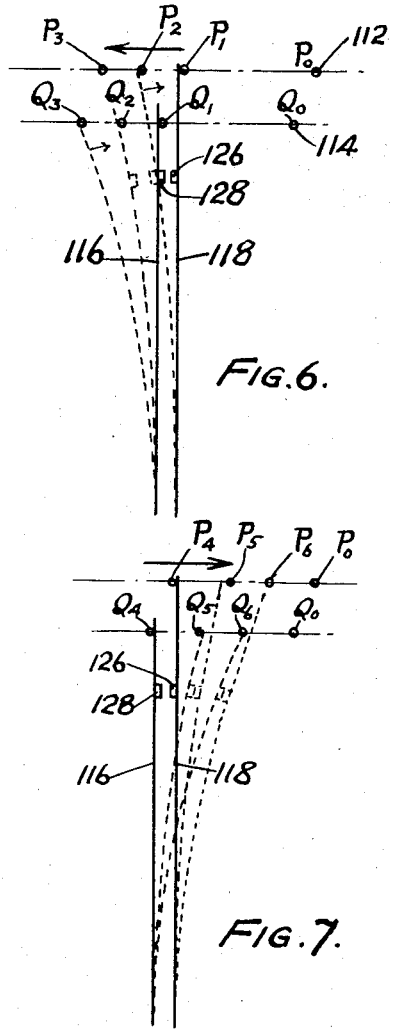
FIG. 6.
FIG. 7.

Patented July 3, 1951

2,559,373

UNITED STATES PATENT OFFICE 2,559,373

WELL SURVEYING INSTRUMENT

Roland Ring, Houston, Tex., assignor to Sperry-Sun Well Surveying Company, Philadelphia, Pa., a corporation of Delaware Application November 16, 1945, Serial No. 629,052

7 Claims. (Cl. 200—36)

This invention relates to a well surveying instrument, and has particular reference to an improved timing means for controlling the operation of such an instrument.

While, as will be pointed out hereafter, the invention is applicable to instruments of various types, including those in which recording occurs photographically, the invention has been particularly designed for control of an instrument having a slow and continuous marking action.

In the patent to Roland Ring 2,246,319, dated June 17, 1941, and in an application of said Roland Ring Serial No. 379,835, filed February 20, 1941, now abandoned, there are described an instrument and methods of operating the same, which instrument is characterized by a slow and continuous marking action, specifically electrolytic in character, whereby a record of the position of the instrument within a bore hole is made only when the instrument remains stationary for an extended period of time. For a better understanding of the nature of the present invention, which is not, however, limited for its application to said instrument of the above mentioned patent and application, the operation of said Ring instrument may be described as follows:

If the instrument is run into a bore hole, either within a drill stem or in an open hole by means of a wire line or cable, the movements of the instrument incidental to its descent into the hole cause a pendulum to move about relative to a record member, so that even though current is continuously flowing from the pendulum to the record member, no point of the record member is exposed to the current action for a sufficiently long time to receive a definite marking. When the instrument reaches the level at which a record of inclination is to be made, it is brought to rest and held in such position for a period of upwards of about one minute, with the result that the electrolytic action is concentrated at one point of the record member and an easily distinguishable spot is made thereon. If it is then desired to make one or more additional records at other levels, the instrument is moved to these successive levels and permitted to remain at them for different periods of time, with the result that marks differing in intensity and/or size are produced which, by their nature, can be identified with the particular levels through a knowledge of the relative times during which the instrument was stationary. Following the completion of the record or records, the instrument is then withdrawn continuously from the hole and in this withdrawing movement, as well as in the periods of movement between the successive recordings, the pendulum will swing relative to the record member so that again no obliterating markings are produced.

In the case of operation of the above type, the instrument is perfectly satisfactory and requires no timing means whatever. However, a common practice in the making of records with other types of surveying instruments involves their being dropped freely through a drill stem so that they come to rest in a position adjacent the bit. During this location in a position of rest, a record is made under the control of suitable timing means and the instrument is then recovered when the bit is brought to the surface, for example for the purpose of changing the bit or checking its condition.

In the use of said Ring instrument in go-devil fashion, the motion of the instrument through the drill stem prevents the making of any record during its fall, and a record is then made by holding the drill stem stationary for a sufficient period of time while the instrument rests adjacent the bit. If the drill stem was then raised and dismantled by continuous work of the drilling crew, the instrument would be subject to sufficient continuous agitation, with only quite limited periods of rest, so that no record obliterating markings would be produced on the record member. However, it is not usual for a derrick crew to work continuously in removing a drill stem from deep holes, and generally speaking, even if some mechanical reason for delay does not occur, the workmen, after raising the drill stem part way, will take a short period of rest before proceeding further. If an instrument of the Ring type is in the drill stem during such a period of rest, or any other period of stationary condition of the drill stem, it will be obvious that another record will be made which might be indistinguishable from the desired record unless a substantially different time of rest is involved, and even then in some rare instances, particularly where the hole is substantially straight, the two records may overlap so that the significance of the original one is lost. It is generally not desirable to rotate the drill stem during such a period of interruption of its withdrawal, and consequently, such rotation is not a practical solution to the problem.

The present invention relates to a timing means of improved construction, which is highly reliable in operation and which may be adapted for the control of various types of well surveying instruments. In particular, the timing means is adapted for terminating the recording action of a recording instrument of the Ring or other type at a desired time.

This and other objects of the invention, particularly relating to details, will become apparent from the following description, read in conjunction with the accompanying drawings, in which:

Figure 5 is a fragmentary sectional view illustrating a modification of the invention adapted for the purpose of controlling both the make and the break of an electric circuit; and Figures 6 and 7 are diagrams illustrating the mode of operation of the modification illustrated in Figure 5.

Figure 1:
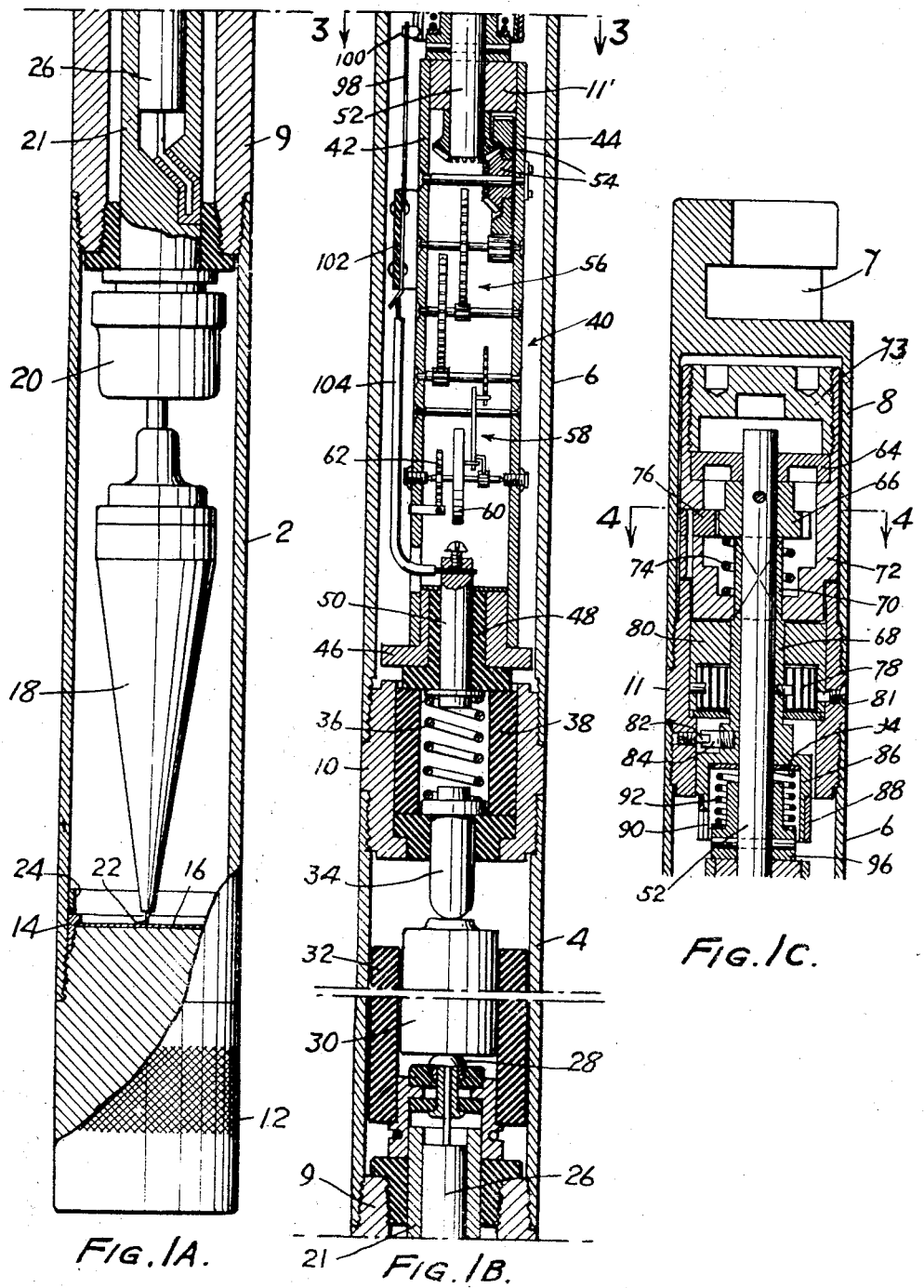
Figures 1A, 1B and 1C are, respectively, longitudinal sectional views through the lower, central and upper portions of a well surveying instrument embodying the invention.
Figure 2:
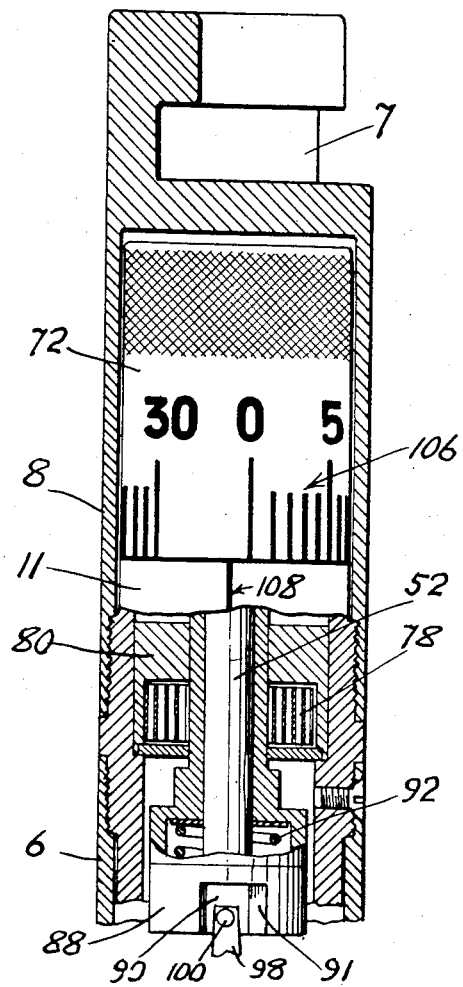
Figure 2 is an enlarged sectional view taken at right angles to the preceding views and showing the upper portion of the instrument with certain parts in elevation rather than section.

The instrument illustrated in the drawing is basically of the type disclosed in said Ring application and comprises an inner casing adapted to be located in a fluid-tight protective casing in use. The inner casing comprises tubes 2, 4 and 6, together with a cap 8 having a T-slot arranged to engage a supporting bolt in the protective casing in the usual fashion. The tubes 2, 4 and 6 are joined by coupling members 9 and 10, and the cap 8 is threaded on the exterior of a coupling member 11 secured to the upper end of the tube 6. Threaded into the bottom of the tube 2 is a plug 12 on which may be secured the record member 16 by means of a threaded ring 14, though the record member may be secured in the plug, for example, by depression within a flanged portion thereof. This record member, as described in detail in said Ring patent and application, preferably comprises a sheet of paper containing a colored material such as a colored metallic ferrocyanide which, upon the passage of an electrical current while it is moist, will be marked with a white spot by reason of the formation of alkali at a cathode provided by a metallic point 22 slidable within a pendulum 18 mounted for universal pivotal movement in a bearing arrangement 20. An insulating ring 24 prevents short circuiting by preventing contact of the pendulum with the metallic wall of the tube 2.

The bearing 20 is mounted at the lower end of a cylindrical pin 21 which extends through an opening in the coupling member 9 and is insulated therefrom as indicated. Within pin 21 there is a resistor 26, the lower lead of which is soldered within an opening in the pin 21 while the upper lead of this resistor is electrically connected to a contact button 28 on which may rest the bottom of the lowermost of a group of batteries 30 arranged in series in flashlight fashion and held within an insulating tube 32.

A contact pin 34 is urged downwardly into engagement with the positive pole of the uppermost battery by means of a spring 36, the pin and spring being mounted in an insulating assembly 38 in the coupling 10. Located above the coupling 10 is a clockwork mechanism indicated generally at 40, which comprises a pair of plates 42 and 44 which at their upper ends are secured to an extension 11' of the coupling 11. At their lower ends these plates are secured to a spacing member 46 in which is located an insulating bushing carrying a metallic pin 50 having a lower flange which engages the spring 36. A shaft 52 projects upwardly from the clockwork mechanism and is connected through bevel gears 54 to the gear train 56 which in turn is controlled by the escapement mechanism 58, the pin wheel 60, and the hair spring 62 of the clockwork mechanism. This clockwork mechanism is of conventional construction and is desirably rugged, resembling to a considerable extent the clockwork mechanism of an alarm clock. This is in contrast to the usually used circuit controlling mechanism of watch-like construction, which is delicate and easily subject to damage by the abuse which is given to well surveying instruments by the drilling crews. The upper end of the shaft 52 has journalled thereon a disc 64, which is secured to a knob member 72 by means of a clamp plug 73. Pinned to the shaft beneath the disc 64 is a gear 66 provided with teeth which are arranged to be engaged by a single tooth 76 mounted in the knob 72. Beneath the gear 66, the shaft 52 is surrounded by a sleeve 68 which is provided with a squared portion 70 extending through a corresponding square opening in the lower end of the knob 72 so that while this sleeve and the knob may be subjected to relative sliding movement, they are constrained to rotate together. A spring 74 reacts between the lower end of the knob 72 and the lower surface of the gear 66.

A housing 80 located within the coupling 11 and locked thereto by a screw 81 provides a chamber for the reception of a strong spiral spring 78, the ends of which are, respectively, anchored to the housing 80 and the sleeve 68. This spring is under an initial tension serving to hold the sleeve 68 in a counterclockwise direction relative to the coupling 11 to a limiting position defined by engagement of a pin 84 secured in the sleeve 68 with a pin 82 secured in the coupling 11.

Figure 3:
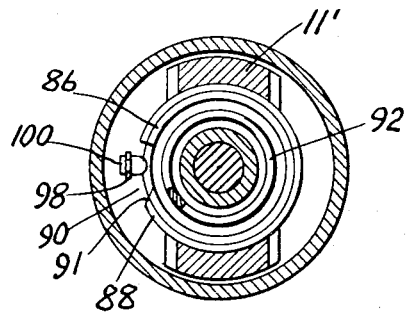
Figure 3 is a transverse section taken on the plane the trace of which is indicated at 3—3 in Figure 1B.
Figure 4:
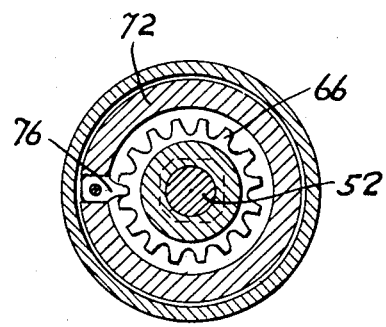
Figure 4 is a transverse section taken on the plane the trace of which is indicated at 4—4 in Figure 1C.

This sleeve 68 has a barrel extension 86 which is surrounded at its lower portion by a ring 88 of silver or other good contact material. Both the barrel 86 and the ring 88 are interrupted by a slot 90, the counterclockwise side of which, as indicated at Figure 3, is bounded by a bevel 91. A spring 92 reacts between a collar 96, pinned to the shaft 52, and a washer 94 located in the barrel 86.

A spring arm 98 carrying a contact button 100 at its upper end is mounted on an insulating support 102 secured to the side plate 42 of the clockwork mechanism. The arrangement is such that when the apparatus is in its non-operating condition, the contact button 100 is located within the notch 90, as indicated in Figure 3, in such position as to be engaged and cammed outwardly by the bevel 91 when the barrel 86 is rotated clockwise.

An insulated wire 104 joins the spring contact 98 with the upper end of the pin 50.

The exterior of the knob 72, the upper portion of which is knurled, is provided with markings 106 graduated in terms of minutes. These markings are read against a zero index marking 108 on the upper end of the coupling 11. For these markings to be visible, of course, the cap 8 is removed. The cap 8 serves as a protection for the knob 106 which during the operation of the instrument must be free to rotate.

In the operation of this instrument, a moistened disc 16 is located in position on the bottom plug 12 which is then threaded into the lower end of the instrument. Even if the pin 22 is in contact with the record disc 16 and even if the contact at 100 was made, the normal handling movements of the instrument will prevent the making of any record, due to the fact that the electrolytic recording action is quite slow. However, the instrument is also such that when inverted, the pin 22 will drop within the pendulum away from the record disc so that operation may be prevented merely by inverting the instrument. Of course, normally until contact is made by the contact arm 98, the circuit of the instrument is opened.

The next step in the operation of the instrument involves the setting of its time of operation. This is accomplished by pulling the knob 72 outwardly and rotating it until the desired time indication is opposite the index 108. When the knob 72 is pulled outwardly, the tooth 76 is disengaged from between the teeth of the gear 66, the spring 74 being compressed in this action. As the knob 72 is rotated, the shaft 52 may then remain stationary. The rotation of the knob causes corresponding rotation of the sleeve 68 and winding of the strong spring 78 with movement of the stop pin 84 clockwise away from the stop pin 82. When sufficient rotation has been accomplished, the knob 72 is permitted to slide inwardly under the action of spring 74 and re-engagement of the gear 66 and the tooth 76 takes place. It may be noted that the gear 66, as illustrated, has only a relatively small number of teeth so that the successive positions of engagement with the tooth 76 are substantially angularly spaced. This, of course, means that the time setting cannot be made to a high degree of accuracy in this instrument. However, as will be pointed out hereafter, this is of no consequence and an error of about two minutes which might be here involved is quite permissible. If, however, a greater accuracy of time setting is required, it is only necessary that the gear 66 should have a larger number of teeth in which case for purposes of strength, a plurality of teeth may be substituted for the single tooth 76.

During the setting rotation of the knob 72, the barrel 86 will be rotated clockwise so as to cam the button 100 upon the contact ring 88. When contact is thus made, it will be evident that the electric circuit through the pin 22 and the disc 16 is completed if they are in contact.

Following the setting, as above described, it will be evident that the spring 78 is now fixedly coupled to the shaft 52 so as to drive the clockwork mechanism, and the run-down rate of the shaft 52 is controlled by the escapement. Accordingly, there is thus provided a predetermined delay before the recording circuit will again be opened.

The cap 8 is then threaded upon the coupling 11 to protect the knob and prevent interference with its rotation. The instrument is then ready to be secured in the protective casing by engagement of the bolt thereon with the T-slot.

Upon water-tight closure of the protective casing, the instrument may then be dropped through the drill stem. As it passes down the drill stem, the continuous agitation which occurs will cause the pendulum 18 to move about in such fashion that no record will be made during the descent. When the instrument reaches its position adjacent to the bit, the pendulum will come to rest and the instrument is permitted to remain at rest for a period sufficient for the formation of a record. The drill stem may then be withdrawn, the withdrawal being interrupted as desired for the production of additional records, as indicated above.

Finally when single or last record has been made, the drill stem is withdrawn with consequent agitation of the instrument until such time elapses as would be required for the opening of the circuit by reason of the fact that the notch 90 comes to a position to receive the contact button 100. Thereafter it is immaterial whether or not the drill stem is continuously withdrawn.

It will now be evident the considerations which govern the time setting of the clockwork mechanism.

An estimate is made of the time which will elapse from the instant the setting is completed through the assembly, lowering and recording actions. This time, with a suitable addition to take care of delays over those estimated, constitutes the time for which the clockwork mechanism is set. To avoid duplication of records, it is only necessary that after the recording takes place the instrument should be kept in motion for a sufficient time to permit the recording circuit to be broken.

The construction of the improved time mechanism eliminates any friction clutch means between the driving spring and the escapement mechanism, the drive being positive so that despite jarring or any other condition which might normally produce slippage in a friction connection, there can be no undesired displacement within the mechanism which might tend to shorten the time of its operation.

The spring 92 through the washer 94 imposes friction on the relative movements of the sleeve 68 and the shaft 52 during the time of setting when these two elements are not positively connected. During the time of their positive connection, there is no relative friction between them imposed by the spring 92 since it reacts between parts which are simultaneously rotating at the same rate of speed. During the setting, however, the friction imposed by the spring 92 prevents accidental slippage in case the grip of the operator slips, i. e., the friction is sufficient to prevent the unwinding of the spring when the tooth 76 is disengaged from the teeth of the gear 66. From the standpoint of this operation, it should be noted that the shaft 52 is effectively stationary since its rotation is controlled by the escapement mechanism.

But the improved timing mechanism is particularly advantageous in the type of instrument heretofore described, particularly because of its compact nature whereby it may be incorporated in an instrument of very small diameter. It may also be used for the reliable timing of other well surveying instruments such as those which involve photographic recording and require that a circuit shall remain opened for a predetermined period while the instrument is being located in recording position followed by a closure of the circuit for a short period, this being in turn followed by the opening of the circuit. Figures 5, 6 and 7 illustrate the adaption of the invention to such use, there being shown only sufficient parts to illustrate the differences which exist over that previously described in detail.

Referring first to Figure 5, there is indicated at 110 a drum which may take the position of the drum 86 previously described, all of the driving mechanism associated with this drum, though not shown in Figure 5, being identical with that previously described. This drum carries a pair of pins 112 and 114, the former of which should be insulated either by its formation of insulating material, or by its being carried by an insulating insert or portion of the drum 110. The pin 114 is arranged to act upon a flexible spring contact member 116 while the pin 112 acts upon a similar member 118. The spring 116 carries contact button 128 (Figures 6 and 7) while the spring 118 carries contact button or lug 126, these buttons being formed of silver or other good contact material. The springs 116 and 118 are mounted on the plate 120 of the timing mechanism, which corresponds to the plate 42 previously described. The spring 116 is mounted on a metallic block carried by the plate 120 through the medium of screws passing through slots 121 which make possible the adjustment of the spring 116 in the direction of its length. This spring is electrically grounded. The other spring 118, however, is insulated by being mounted upon an insulating block 122. An electrical connection 124 passes to the ungrounded side of the electrical circuit, which may be of any conventional type including lamps and batteries.

The action of the mechanism of Figure 5 will be understood from consideration of Figures 6 and 7. Assume that the run-down condition of the device involves the location of pins 112 and 114 in the positions $P_0$, $Q_0$, i. e., those positions which correspond to engagement of the equivalent of stop pins 82 and 84. In the setting of the apparatus, the drum 110 is turned clockwise, as in the previously described modification, so that the pins move in the direction of the arrow in Figure 6. During this setting movement, the arrangement is such that no contact is made as will be clear from the following discussion.

The springs 116 and 118 are such that in this unflexed condition, the contact buttons 126 and 128 are separated. As the pins move to the positions $P_1$, $Q_1$, substantially simultaneous contacts are made by them with the upper ends of the springs. As will be noted from the figures, the spring 118 projects only slightly beyond the path of pin 112, while spring 116 projects to a greater extent beyond the path of the pin 114. From the position $P_1$, $Q_1$ to the position $P_2$, $Q_2$, the springs are simultaneously flexed and the buttons remain out of contact in this position. However, the spring 118 is about to be released by the pin 112 so that as this position is passed the spring 118 will snap to its vertical position. The spring 116, however, is not released until the pins reach the position $P_3$, $Q_3$, whereupon the release of the spring 116 will permit it to snap to its vertical position. In this last movement, of course, the buttons may momentarily engage due to overrun of the spring 116. However, this contact is of such small duration that the lamps, due to their thermal inertia, will not be illuminated or if they are, the illumination will be a mere momentary flash incapable of producing an exposure. Beyond the positions $P_3$, $Q_3$, the pins are then rotated to the setting position for the time which should elapse before operation occurs.

The timing mechanism then begins to rundown and the pins now move in the direction of the arrow in Figure 7. In this reverse movement, the pins first engage the contact springs when they occupy the positions $P_4$, $Q_4$. The springs are then again simultaneously flexed until the position $P_5$, $Q_5$ is reached, at which time the spring 118 is released by its pin 112. When so released, it snaps to the left so that the contact buttons are engaged, inasmuch as the spring 116 by reason of its extension above the pin 114 has not been released.

If further movement occurs toward the position $P_6$, $Q_6$, the pin 114 flexes the spring 116 further to the right and through the engagement of the contact buttons the spring 118 is carried therewith. When the positions $P_6$, $Q_6$ are reached, however, the spring 116 is released and consequently both springs may snap to their vertical positions. It follows that the electrical circuit is closed between the positions $P_5$, $Q_5$ and positions $P_6$, $Q_6$. The interval of this circuit closure may be adjusted, within limits, by the vertical adjustment of the spring 116 on its support. Finally, the pins come to rest in an original position, such as $P_0$, $Q_0$, this position corresponding to the stopping of the clockwork mechanism.

As a result of the above action, it will be evident that except for possible momentary contact, the only operating contact occurs following the desired interval of delay of the recording action.

The springs are preferably made sufficiently stiff that vibrations of the instrument during lowering and raising thereof will not cause the contacts to close. However, even if they do, due to vibration, the contacts so made will be momentary, and if the filaments of the lamps are lighted at all, such lighting will occur only in flashes of insufficient duration to effect any recording action.

It will be clear from the above that variations may be made in the construction without departing from the principles and advantages thereof. Accordingly, the invention is not to be regarded as restricted, except as required by the following claims.

What I claim and desire to protect by Letters Patent is:

1. In combination, a switch arranged to control an electrical circuit, and mechanism for controlling said switch, said switch comprising a rotary member, and said mechanism comprising a spring operatively connected to said rotary member for driving said rotary member, an escapement, a rotary element controlled by said escapement, and disengagable clutching means for positively clutching said rotary member to said rotary element so that movement of the rotary member is controlled by the escapement and for disengaging said rotary member from said rotary element so that the rotary member may be manually rotated forwardly or backwardly for winding or unwinding said driving spring.

2. In combination, a switch arranged to control an electrical circuit, and mechanism for controlling said switch, said switch comprising a rotary member, and said mechanism comprising a spring operatively connected to said rotary member for driving said rotary member, an escapement, a rotary element controlled by said escapement, and disengagable clutching means for positively clutching said rotary member to said rotary element so that movement of the rotary member is controlled by the escapement and for disengaging said rotary member from said rotary element so that the rotary member may be manually rotated forwardly or backwardly for winding or unwinding said driving spring while presetting the time of operation of the switch.

3. In combination, a switch arranged to control an electrical circuit, and mechanism for controlling said switch, said switch comprising a rotary member, and said mechanism comprising a spring operatively connected to said rotary member for driving said rotary member, and escapement, a rotary element controlled by said escapement, disengagable clutching means for positively clutching said rotary member to said rotary element so that movement of the rotary member is controlled by the escapement and for disengaging said rotary member from said rotary element so that the rotary member may be manually rotated forwardly or backwardly for winding or unwinding said driving spring and means frictionally opposing relative movement between the rotary member and the rotary element.

4. In combination, a switch arranged to control an electrical circuit, and mechanism for controlling said switch, said switch comprising a rotary member, and said mechanism comprising a spring operatively connected to said rotary member for driving said rotary member, an escapement, a rotary element comprising inter-engaging toothed members for positively clutching said rotary member to said rotary element so that movement of the rotary member is controlled by the escapement and for disengaging said rotary member from said rotary element so that the rotary member may be manually rotated forwardly or backwardly for winding or unwinding said driving spring while presetting the time of operation of the switch.

5. In combination, a switch arranged to control an electrical circuit, and mechanism for controlling said switch, said switch comprising a rotary member, and said mechanism comprising a spring operatively connected to said rotary member for driving said rotary member, an escapement, a rotary element controlled by said escapement, and disengagable clutching means comprising inter-engaging toothed members for positively clutching said rotary member to said rotary element so that movement of the rotary member is controlled by the escapement and for disengaging said rotary member from said rotary element so that the rotary member may be manually rotated forwardly or backwardly for winding or unwinding said driving spring while presetting the time of operation of the switch, said toothed members being disengageable by axial movement of said rotary member.

6. In combination, a switch arranged to control an electrical circuit, and clockwork mechanism for controlling said switch, said switch comprising a rotary member, the movement of which is controlled by said mechanism, said switch including contact elements mounted on flexible mounting members, said mounting members being arranged for engagement by the rotary member during its movement in one direction to close the circuit but arranged when engaged by the rotary member during its movement in the opposite direction to provide no closure of the circuit of more than momentary duration.

7. In combination, a switch arranged to control an electrical circuit, and clockwork mechanism for controlling said switch, said switch comprising a rotary member, the movement of which is controlled by said mechanism, said switch including contact elements mounted on flexible mounting members, said mounting members being arranged for engagement by the rotary member, the relative length of the flexible members with respect to the points of engagement thereof by the rotary member being such as to close the circuit during movement of the rotary member in one direction, but when engaged by the rotary member during its movement in the opposite direction to provide no closure of the circuit of more than momentary duration.

ROLAND RING.

REFERENCES CITED

The following references are of record in the file of this patent:

UNITED STATES PATENTS

| Number | Name | Date |
| --- | --- | --- |
| 632,763 | Smith | Sept. 12, 1899 |
| 1,277,464 | Norwood | Sept. 2, 1918 |
| 1,666,129 | Frantz | Apr. 17, 1928 |
| 1,773,697 | Rhodes | Aug. 19, 1930 |
| 1,971,210 | Cauli | Aug. 21, 1934 |